US012228412B2

(12) United States Patent
Gall et al.

(10) Patent No.: US 12,228,412 B2
(45) Date of Patent: Feb. 18, 2025

(54) ERRAND SERVICE ASSOCIATED WITH RIDE REQUEST

(71) Applicant: Motional AD LLC, Boston, MA (US)

(72) Inventors: Kevin C. Gall, Newmarket, NH (US); Bence Cserna, East Boston, MA (US); Alexander Brown, Boston, MA (US)

(73) Assignee: Motional AD LLC, Boston, MA (US)

(*) Notice: Subject to any disclaimer, the term of this patent is extended or adjusted under 35 U.S.C. 154(b) by 310 days.

(21) Appl. No.: 17/878,770

(22) Filed: Aug. 1, 2022

(65) Prior Publication Data
US 2024/0035830 A1 Feb. 1, 2024

(51) Int. Cl.
*G01C 21/34* (2006.01)
*G06Q 50/40* (2024.01)

(52) U.S. Cl.
CPC ....... *G01C 21/343* (2013.01); *G01C 21/3438* (2013.01); *G06Q 50/40* (2024.01)

(58) Field of Classification Search
None
See application file for complete search history.

(56) References Cited

U.S. PATENT DOCUMENTS

| 10,233,021 | B1 | 3/2019 | Brady et al. |
| 10,679,312 | B2 | 6/2020 | Matthiesen et al. |
| 11,493,345 | B1* | 11/2022 | Williams ............. G05D 1/0088 |
| 2019/0208254 | A1 | 7/2019 | Raajan et al. |
| 2020/0089257 | A1* | 3/2020 | Gaither ................ G05D 1/0016 |
| 2020/0151631 | A1* | 5/2020 | Lamers .................. G08G 1/202 |
| 2020/0250772 | A1 | 8/2020 | Höflich et al. |
| 2020/0363220 | A1 | 11/2020 | Simoudis |
| 2024/0094012 | A1 | 3/2024 | Cserna et al. |

FOREIGN PATENT DOCUMENTS

| EP | 3522082 | 8/2019 |
| JP | 2015-210726 | 11/2015 |
| WO | WO 2020/055770 | 3/2020 |

(Continued)

OTHER PUBLICATIONS

International Search Report and Written Opinion in the International Appln. No. PCT/US2023/032938, mailed on Dec. 19, 2023, 16 pages.

(Continued)

*Primary Examiner* — James J Lee
*Assistant Examiner* — Elizabeth Galyn Martinez
(74) *Attorney, Agent, or Firm* — Fish & Richardson P.C.

(57) ABSTRACT

Provided are methods for completing an errand request prior to fulfilling a ride request. Some methods described include obtaining a ride request from a passenger; obtaining an errand request from the passenger, wherein the errand request comprises performing an activity at a third location prior to pickup of the passenger at the first location; planning a route comprising the third location, the first location, and the second location; navigating the planned route to complete the errand request from the passenger at the third location; and navigating the planned route to transport the passenger from the first location to the second location upon completion of the errand request. Systems and computer program products are also provided.

12 Claims, 13 Drawing Sheets

(56) References Cited

FOREIGN PATENT DOCUMENTS

WO     WO 2022/072314     4/2022

OTHER PUBLICATIONS

Sprankles, "Everything To Know About Uber Trip Experiences", Bustle, Jan. 13, 2016, retrieved from URL<https://www.bustle.com/articles/135305-what-is-uber-trip-experiences-get-the-rundown-on-this-new-feature-before-your-next-down-on-this-new-feature-before-your-next-ride>, retrieved on Dec. 4, 2023, 3 pages.
Weissbrot, "Car Service APIs Are Everywhere, But What's In It For Partner Apps?", Ad Exchanger, Jul. 7, 2016, retrieved from URL<https://www.adexchanger.com/mobile/car-service-apis-everywhere-whats-partner-apps/>, retrieved on Dec. 4, 2023, 5 pages.
International Search Report and Written Opinion in International Appln. No. PCT/US2023/029197, mailed on Nov. 14, 2023, 12 pages.
[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
TechnologyReview.com [online], "Autonomous Vehicles: Are You Ready for the New Ride?" Nov. 9, 2017, retrieved on Apr. 28, 2022, retrieved from URL <https://www.technologyreview.com/2017/11/09/105139/autonomous-vehicles-are-you-ready-for-the-new-ride/>, 11 pages.

* cited by examiner

ERRAND SERVICE ASSOCIATED WITH RIDE REQUEST

BACKGROUND

A vehicle (e.g., an autonomous vehicle) is operable along a predetermined path from a starting location to a destination location to fulfill a ride request from a passenger.

DETAILED DESCRIPTION

Figure 1:
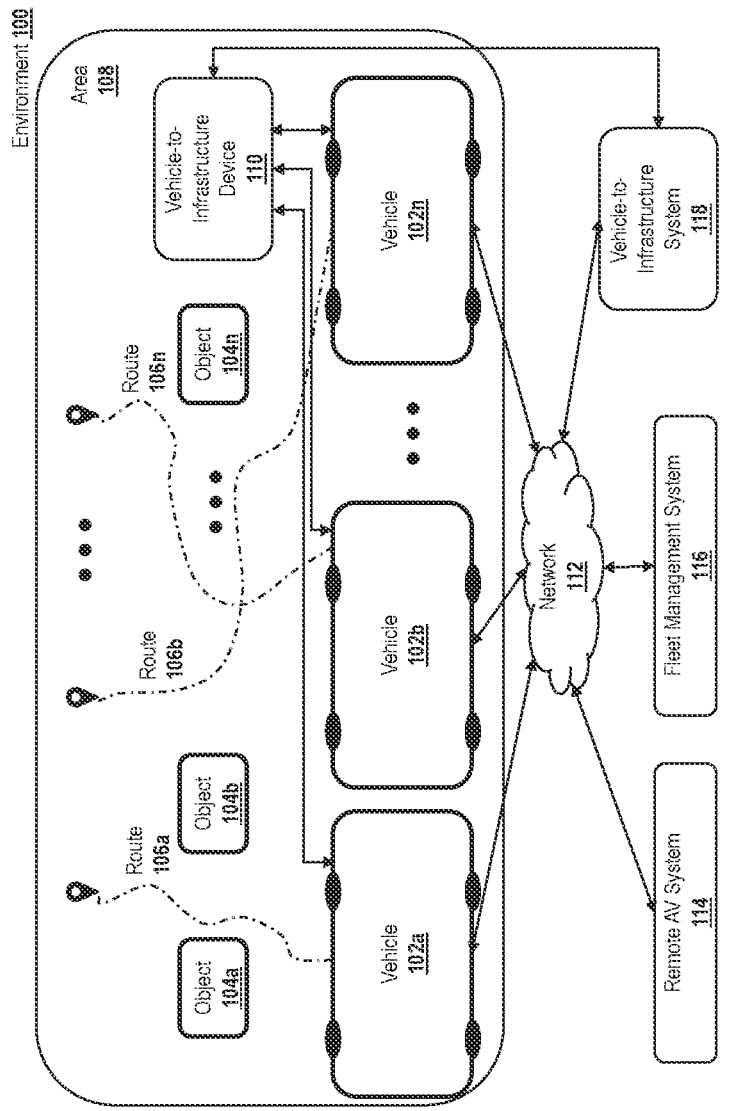
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like, are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement fulfilling a ride request and completing an errand by the same vehicle (e.g., an autonomous vehicle). In particular, a passenger requests a ride and completion of an errand, which are both fulfilled by the same vehicle (e.g., the autonomous vehicle). For example, the passenger requests transportation (e.g., a ride request) from a first location to a second location. The passenger also requests completion of an errand associated with a third location. The vehicle plans a route including the three locations. In some implementations, the vehicle fulfills the errand request associated with the third location prior to fulfilling the ride request to transport the passenger from the first location to the second location. In some embodiments, the vehicle fulfills the errand request associated with the third location subsequent to fulfilling the ride request to transport the passenger from the first location to the second location.

By virtue of the implementation of systems, methods, and computer program products described herein, some of the advantages of these techniques include using a vehicle (e.g., an autonomous vehicle) to complete errands for the passenger as well as providing transportation services, which is convenient and time-saving for the passenger. For example, the vehicle can autonomously pick up an item (e.g., equipment, a device, food, groceries, or goods), a person (human service provider, family member), or a pet prior to providing transportation services for the passenger. The vehicle can also autonomously return the item or drop off the human service provider or the pet subsequent to the ride.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
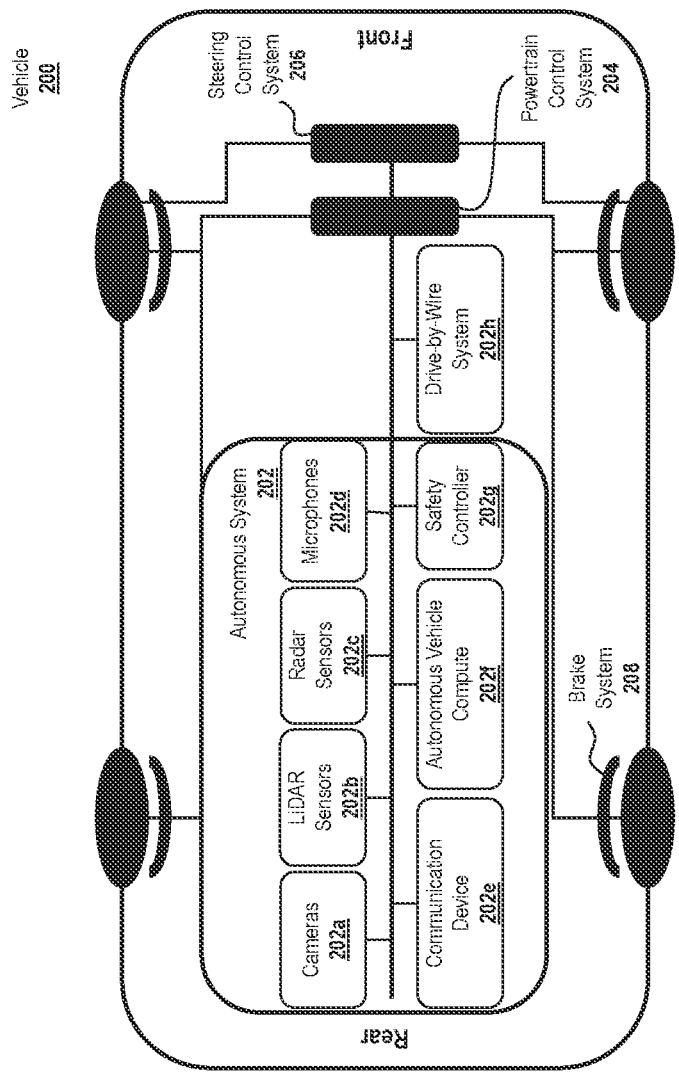
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
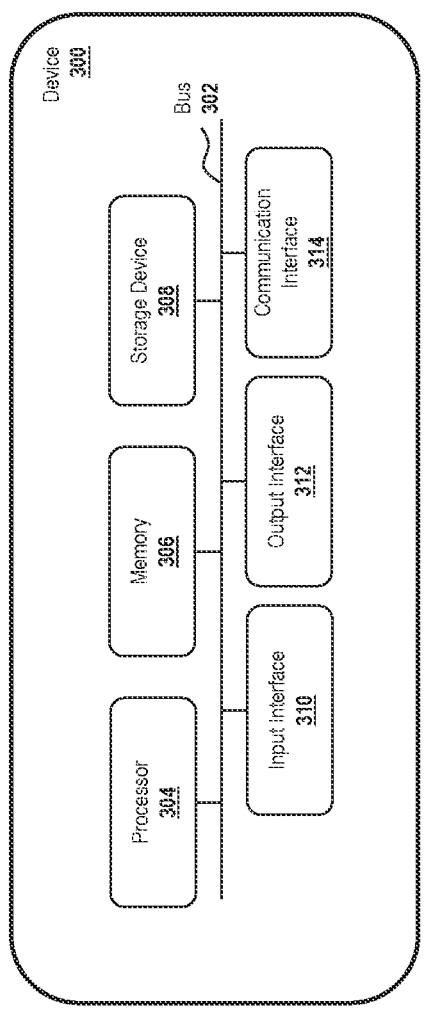
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle (AV) compute 400, described herein. Additionally, or alternatively, in some embodiments, autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h*, and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located on the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
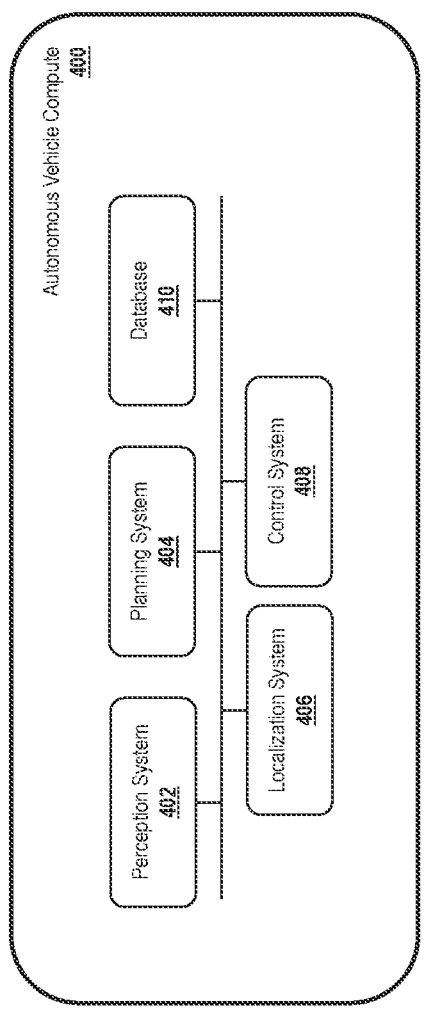
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106 of FIG. 1) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406, and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
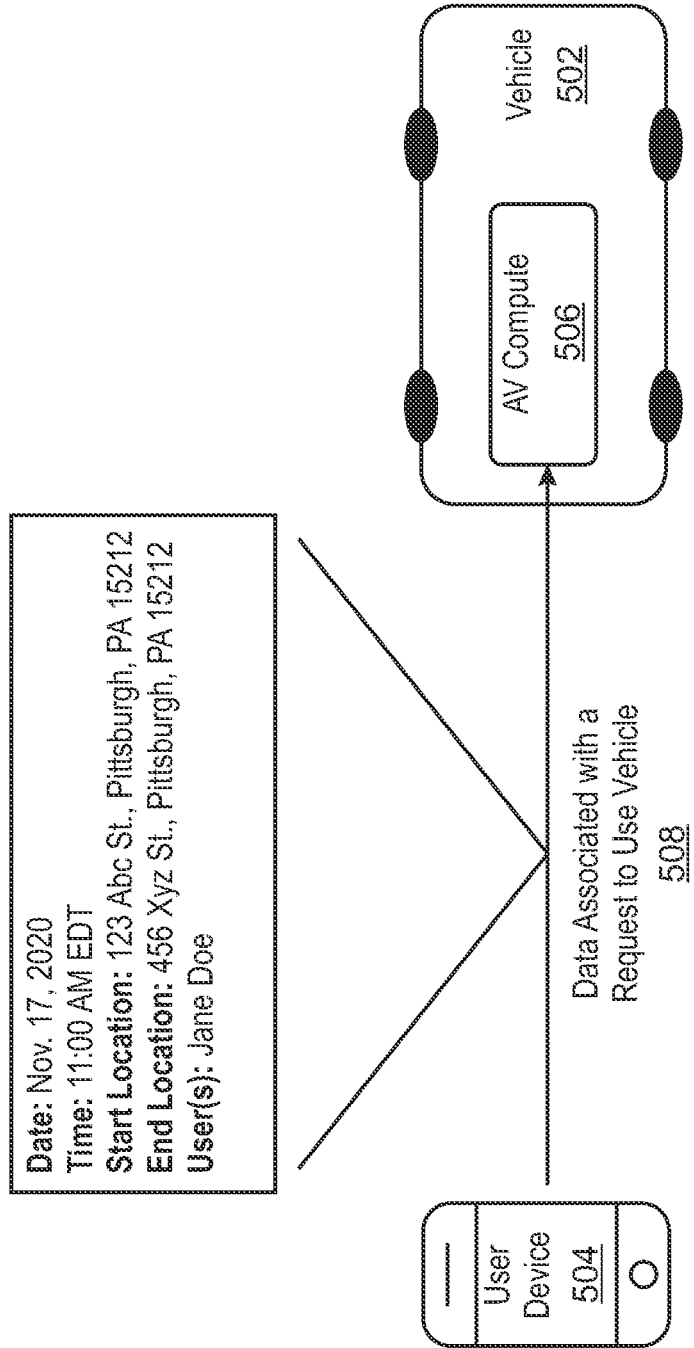
FIG. 5 is a diagram of an implementation of a process for a ride request.

FIG. 5 illustrates a diagram of an implementation 500 of a process for a ride request. In some embodiments, implementation 500 includes vehicle 502 and user device 504. In some embodiments, vehicle 502 is the same as or similar to vehicles 102a-102n as shown in FIG. 1 and vehicle 200 as shown in FIG. 2. The vehicle 502 includes autonomous vehicle (AV) compute 506, which is the same as or similar to the autonomous vehicle compute 400 as shown in FIG. 4.

In some embodiments, the user device 504 is a mobile phone, a computer, a laptop, a tablet, a personal digital assistant, or other user electronic devices. In an example, the user device 504 transmits a ride request that is obtained by the AV compute 506 of the vehicle 502. In particular, the user device 504 transmits data 508 associated with a ride request to the AV compute 506. For example, the data 508 includes the date of the ride, the time of the ride, the starting location of the ride, the destination location of the ride, and user(s) of the ride. Vehicle 502 is dispatched to the starting location (123 Abc St., Pittsburgh, PA, 15212) at the specified time (11:00 AM EDT) on the specified date (Nov. 17, 2020) to pick up the user (Jane Doe) and navigate to the destination location (456 Xyz St., Pittsburgh, PA, 15212). In some embodiments, vehicle 502 further completes an errand prior to pickup of the user at the starting location or subsequent to the drop-off of the user at the destination location.

In some embodiments, the autonomous vehicle compute 400 of FIG. 4 is used to execute the ride request and the errand request. For example, the starting location and the destination location obtained from the ride request are input into the planning system 404, which generates at least one route (e.g., routes 106 of FIG. 1) for the vehicle 502. On the route fulfilling the ride request and the errand request, the localization system 406 receives data representing a location of the vehicle 502, and sends the data to the planning system 404. The planning system 404 may adjust the route 106 based on the real-time location of the vehicle 502. For example, if a road is blocked due to an accident and the vehicle 502 has to detour, the planning system 404 regenerates a route 106 for the vehicle 502.

Figure 6:
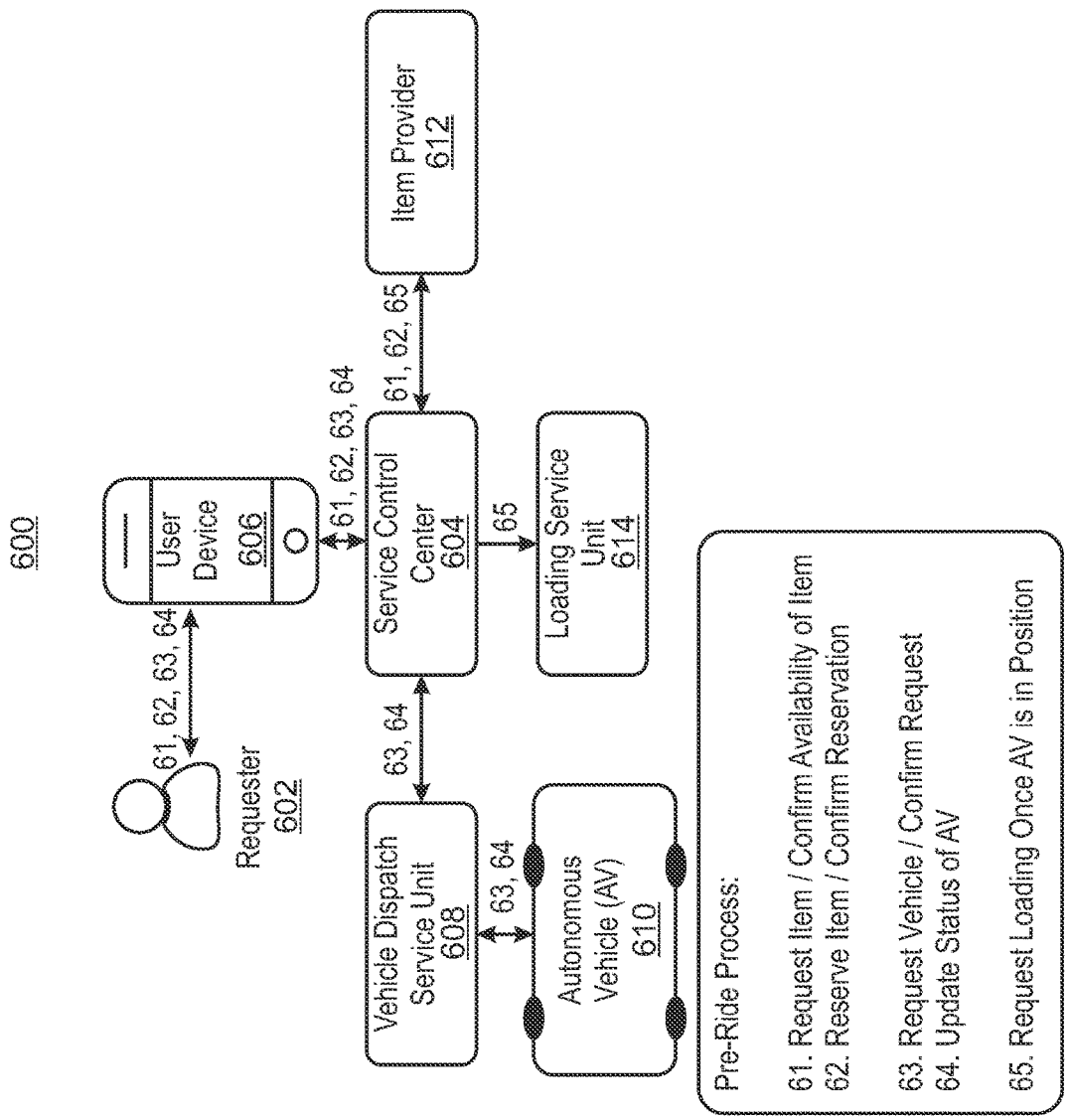
FIG. 6 is a diagram of an example architecture for providing an item before a ride.

FIG. 6 is a diagram of an example architecture 600 for executing an errand before a ride. In some embodiments, a requester or a user 602 sends a request (e.g., a ride request, an errand request, or a service request) to service control center 604 via a user device 606. The user device 606 is the same as or similar to the user device 504 of FIG. 5. In an example, the requester 602 sends a request through a mobile application executed on the user device 606. In another example, the requester 602 sends a request through a website accessed by the user device 606.

In an example, the service control center 604 is implemented on one or more remote servers, e.g., cloud-based servers (e.g., remote AV system 114, fleet management system 116, and/or vehicle-to-infrastructure system 118 of FIG. 1). The service control center 604 controls or/and provides different services to the requester 602, for example, vehicle dispatch service, loading service, provision of an item, such as a piece of equipment, a device, goods, foods, groceries, or any other items.

In an example, vehicle dispatch service unit 608 is implemented on one or more remote servers, e.g., cloud-based servers (e.g., remote AV system 114, fleet management system 116, and/or vehicle-to-infrastructure system 118 of FIG. 1). The vehicle dispatch service unit 608 controls and coordinates a fleet of autonomous vehicles (AVs). When the requester 602 requests a ride (e.g., initiates a ride request), the service control center 604 forwards the request to the vehicle dispatch service unit 608. The dispatch service unit 608 selects an available AV 610 and dispatches this AV 610 to pick up the requester 602 at a starting location.

Before pickup of the requester 602, the service control center 604 can provide another errand service, for example, pickup of an item for the requester 602. For instance, the vehicle dispatch service unit 608 dispatches the AV 610 to an item provider 612 to pick up an item requested by the requester 602.

When the AV 610 arrives at a specified location, e.g., the location of the item provider 612 or the ride starting location, the loading service unit 614 provides loading service. In an example, the loading service unit 614 is implemented (e.g., completely, partially, and/or the like) by the autonomous vehicle compute of the AV 610, which is the same as or similar to the autonomous vehicle compute 400 of FIG. 4. The loading service unit 614 automatically opens the vehicle door upon authentication of the identity of item provider 612 or requester 602. The item provider 612 places the requested item in the AV 610, or the requester 602 enters into the AV 610 to start a ride. In some embodiments, the mobile application (e.g., Lyft, Uber) executed on the user device 606 can perform authentication of the requester 602 (e.g., a passenger), and allow the requester 602 to enter the AV 610. In some embodiments, the item provider 612 (e.g., a shop owner) registers as a known service provider through the mobile application, and thus the mobile application can perform authentication of the item provider 612. In some embodiments, the AV 610 can use one or more sensors (e.g., camera, weight sensor) placed within the AV 610 to verify whether an item or a person loaded into the AV 610 matches expectations (e.g., size, weight, face recognition, voice recognition). If the verification is successful, the AV 610 is ready to travel to the destination location; otherwise, the AV 610 would not start. In some embodiments, the requester 602 or the item provider 612 can report to (e.g., through the mobile application, or a touch screen of the AV 610) the AV 610 that an item or a person has been loaded. Accordingly, the AV 610 is ready to travel to the destination location, without additional verification.

Prior to the ride, the requester 602 requests an item via the user device 606 (61) by initiating an errand request. The service control center 604 forwards the request to item provider 612, and the item provider 612 confirms the availability of the requested item (61). The requester 602 reserves the item, and the item provider 612 confirms the reservation (62). The requester 602 further requests a ride (e.g., initiates a ride request) via the user device 606, and the service control center 604 confirms the request (63). The service control center 604 forwards the request to the vehicle dispatch service unit 608. The vehicle dispatch service unit 608 selects an available AV 610 for dispatch. The service control center 604 continuously sends the status of the AV 610 to the service control center 604, which forwards the status to the user device 606 (64). When the AV 610 arrives at the location of the item provider 612, the service control center 604 instructs the loading service unit 614 to load the requested item from the item provider 612 (65). After loading the item, the AV 610 navigates to the starting location to pick up the requester 602. When the AV 610 arrives at the starting location, the loading service unit 614 allows the requester 602 to enter into the AV 610 (65).

Figure 7:
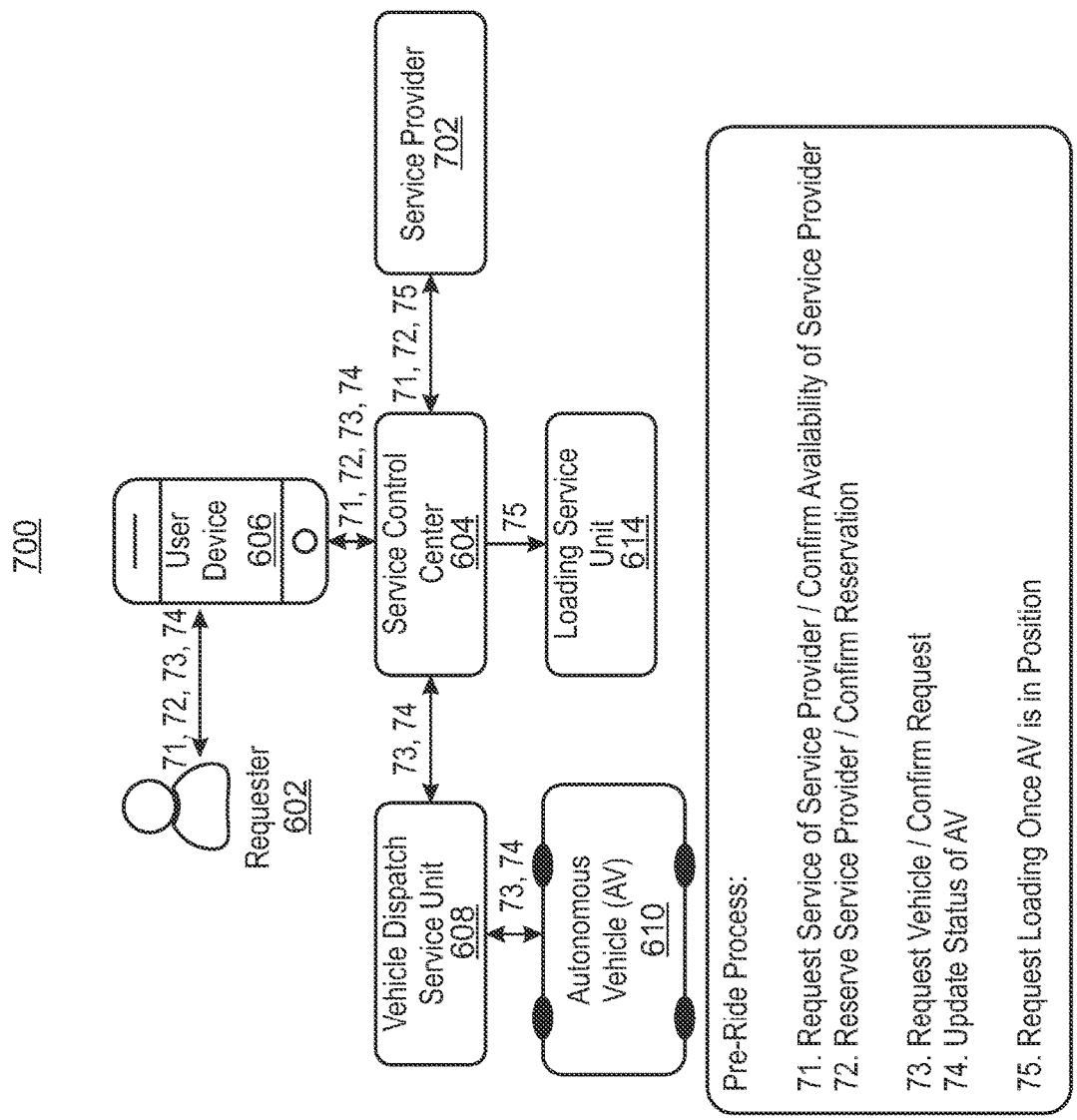
FIG. 7 is a diagram of another example architecture for picking up a service provider before a ride.

FIG. 7 is a diagram of another example architecture 700 for executing another errand before a ride. In some embodiments, the AV 610 picks up a service professional or a service provider 702 (such as a hairdresser, a nail stylist, a massage therapist, a handyman, a contractor, a plumber, an electrician, or other professional) prior to pickup of the requester 602.

In some embodiments, prior to the ride, the requester 602 requests the service of a service provider 702 via the user device 606 by initiating an errand request. The service control center 604 forwards the request to the service provider 702, and the service provider 702 confirms his/her availability. The requester 602 reserves the service provider 702, and the service provider 702 confirms reservation (72). The requester 602 further requests a vehicle for a ride (e.g., initiates a ride request) via the user device 606, and the service control center 604 confirms the request (73). The service control center 604 forwards the request to the vehicle dispatch service unit 608. The vehicle dispatch service unit 608 selects an available AV 610 for dispatch. The service control center 604 continuously sends the status of the AV 610 to the service control center 604, which forwards the status to the user device 606 (74). When the AV 610 arrives at the location of the service provider 702, the loading service unit 614 allows the service provider 702 to enter into the AV 610 (75). After pickup of the service provider 702, the AV 610 navigates to the starting location to pick up the requester 602. When the AV 610 arrives at the starting location, the loading service unit 614 allows the requester 602 to enter into the AV 610 (75).

Figure 8:
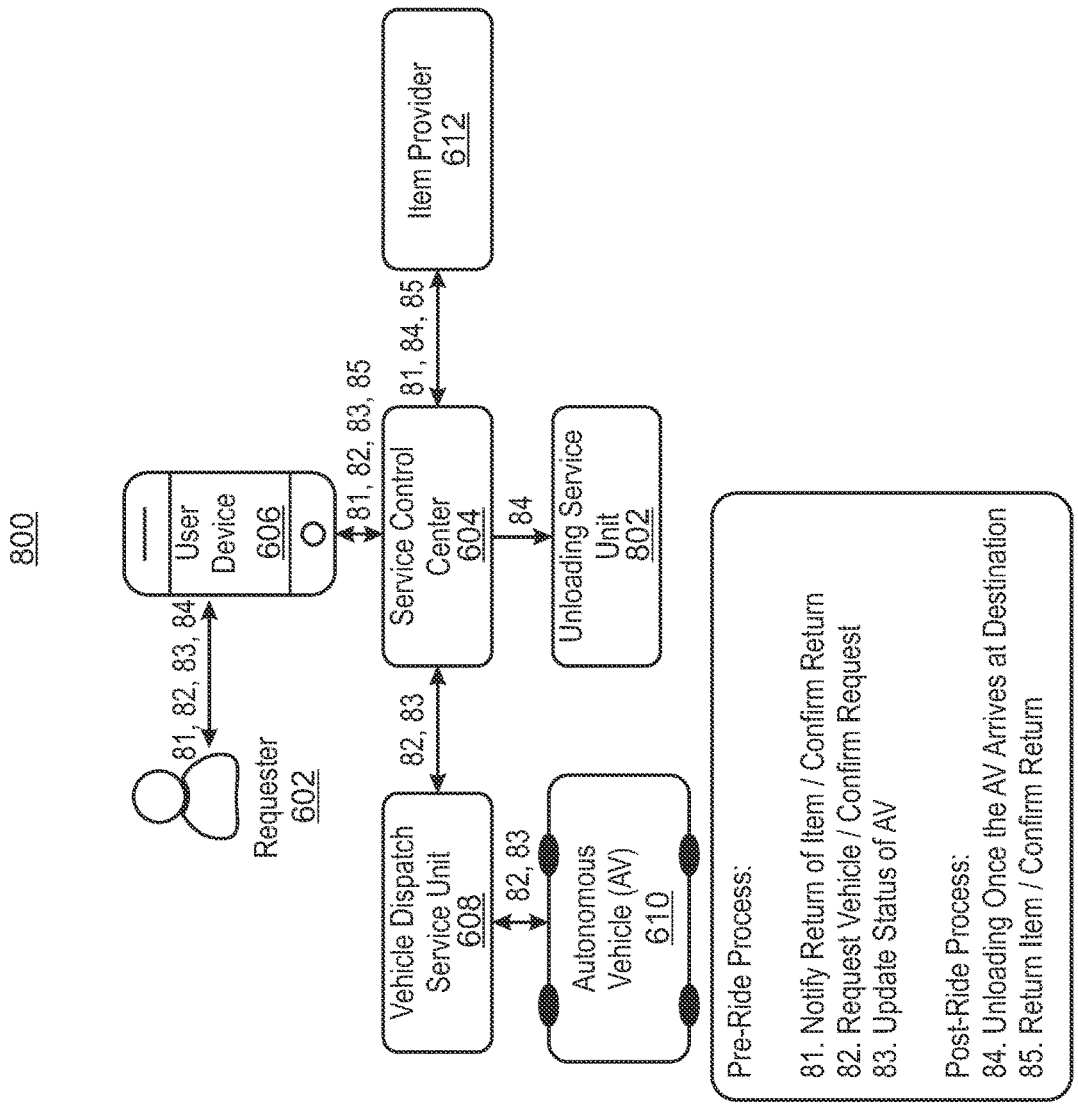
FIG. 8 is a diagram of an example architecture for returning an item after a ride.

FIG. 8 is a diagram of an example architecture 800 for executing an errand after a ride. In some embodiments, the AV 610 returns an item to the item provider 612 subsequent to the drop-off of the requester 602.

In some embodiments, prior to the ride, the requester 602 notifies or requests, via the user device 606, the item provider 612 that the item will be returned at a specified time point (81) by initiating an errand request. The service control center 604 forwards the request to item provider 612, and the item provider 612 confirms the return of the item (81). The requester 602 further requests a ride (e.g., initiates a ride request) via the user device 606, and the service control center 604 confirms the request (82). The service control center 604 forwards the request to the vehicle dispatch service unit 608. The vehicle dispatch service unit 608 selects an available AV 610 for dispatch. The service control center 604 continuously sends the status of the AV 610 to the service control center 604, which forwards the status to the user device 606 (83). The AV 610 picks up the requester 602 and navigates the requester 602 to the destination location. When the AV 610 arrives at the destination location, the unloading service unit 802 allows the requester 602 to leave the AV 610 (84). After drop-off of the requester 602, the AV 610 navigates to the location of the item provider 612. When the AV 610 arrives at the location of the item provider 612, the service control center 604 instructs the unloading service unit 614 to unload the item and return it to the item provider 612 (84, 85).

In an example, the unloading service unit 802 is implemented (e.g., completely, partially, and/or the like) by the autonomous vehicle compute of the AV 610, which is the same as or similar to the autonomous vehicle compute 400 of FIG. 4. The unloading service unit 802 automatically opens the vehicle door upon authentication of the identity of item provider 612 or requester 602. The item provider 612 removes the item from the AV 610, or the requester 602 leaves the AV 610 to complete the ride.

Figure 9A:
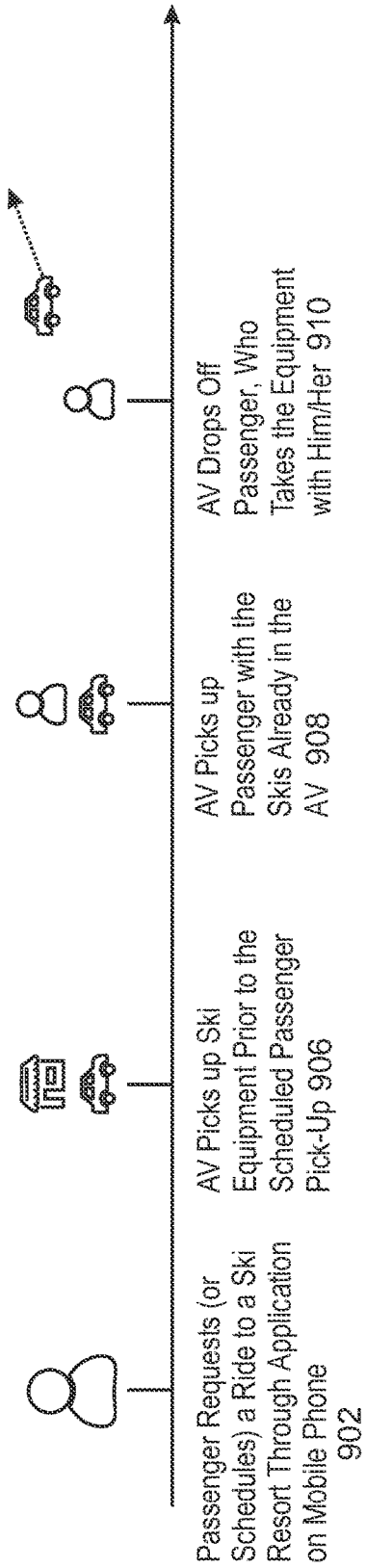
FIG. 9A illustrates an example sequence diagram of picking up a piece of equipment prior to the start of a passenger ride.

FIG. 9A illustrates an example sequence diagram of executing an errand prior to the start of a passenger ride. The sequence diagram of FIG. 9A is implemented (e.g., completely, partially, and/or the like) by the architecture 600 of FIG. 6, the architecture 700 of FIG. 7, the architecture 800 of FIG. 8, or any combinations thereof. In an example, a passenger or a user requests a ride (e.g., initiates a ride request) to a ski resort through an application executing, at least partially, on a user device, e.g., a mobile phone (902). The passenger also initiates an errand request, e.g., the passenger requests to have an AV pick up ski equipment at a local ski equipment rental shop (904). An AV navigates to the local ski equipment rental shop to pick up a piece of ski equipment prior to scheduled passenger pickup (906). After the pickup of the ski equipment, the AV navigates to the ride starting location to pick up the passenger (908). The AV navigates to the ride destination location and drops off the passenger at the ride destination location (e.g., a ski resort). The passenger takes the ski equipment with him/her and leaves the AV (910).

Figure 9B:
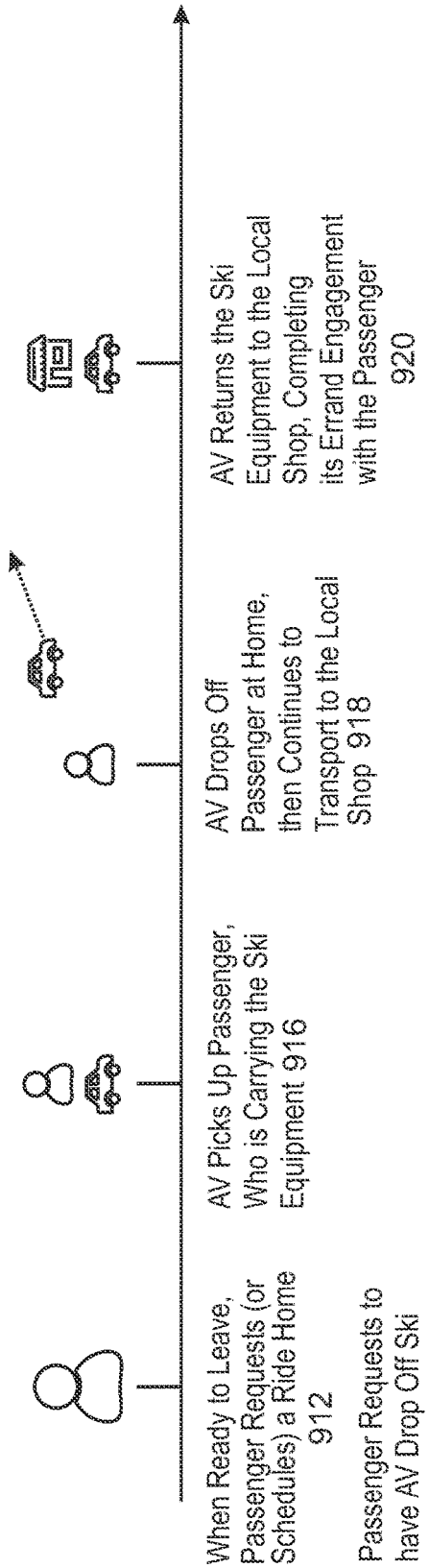
FIG. 9B illustrates an example sequence diagram of returning a piece of equipment subsequent to completion of a passenger ride.

FIG. 9B illustrates an example sequence diagram of executing another errand subsequent to completion of a passenger ride. The sequence diagram of FIG. 9B is implemented (e.g., completely, partially, and/or the like) by the architecture 600 of FIG. 6, the architecture 700 of FIG. 7, the architecture 800 of FIG. 8, or any combinations thereof. In an example, when the passenger is ready to leave the ski resort, the passenger requests or schedules a ride (e.g., initiates a ride request) back home (912). The passenger also initiates an errand request, e.g., the passenger requests to have an AV drop off ski equipment at the local ski equipment rental shop (914). An AV picks up the passenger, who is carrying ski equipment (916). The AV navigates to the destination location (e.g., home) and drops off the passenger at the destination location (918). The AV continues to navigate to the local ski equipment rental shop. The AV returns the ski equipment to the local ski equipment rental shop, completing its errand engagement with the passenger (920).

Figure 10A:
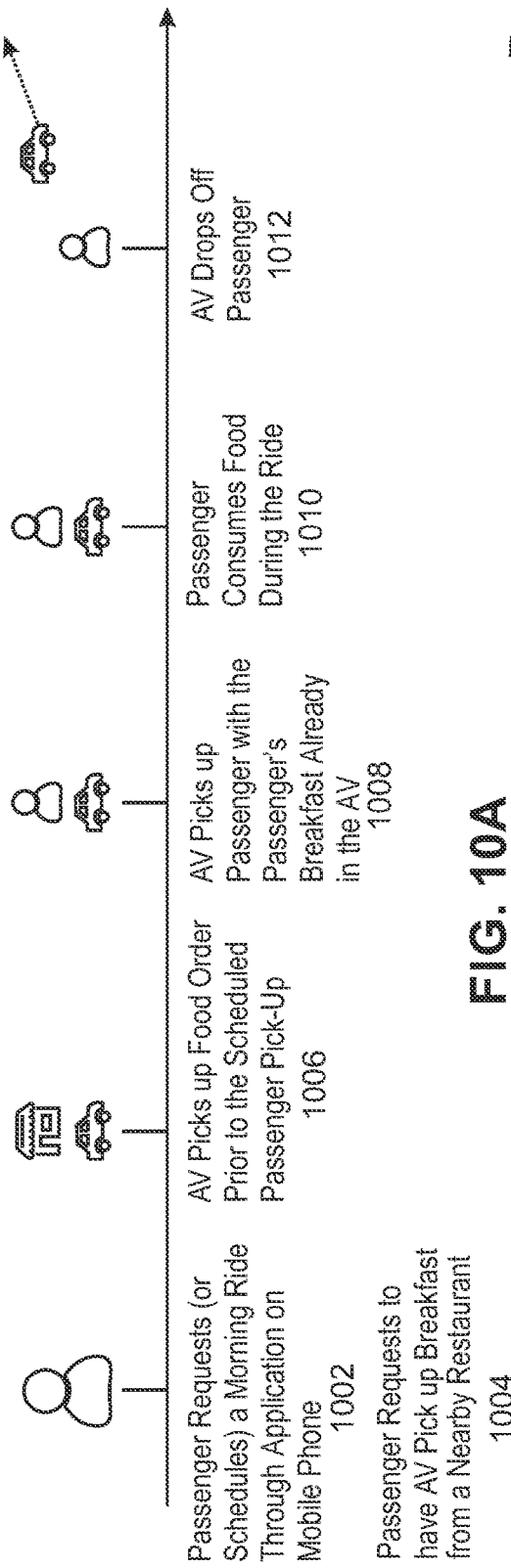
FIG. 10A illustrates an example sequence diagram of picking up food prior to the start of a passenger ride.

FIG. 10A illustrates an example sequence diagram of executing another errand prior to the start of a passenger ride. The sequence diagram of FIG. 10A is implemented (e.g., completely, partially, and/or the like) by the architecture 600 of FIG. 6, the architecture 700 of FIG. 7, the architecture 800 of FIG. 8, or any combinations thereof. In an example, a passenger or a user requests a morning ride (e.g., initiates a ride request) through an application executing, at least partially, on a user device, e.g., a mobile phone (1002). The passenger also initiates an errand request, e.g., the passenger requests to have an AV pick up breakfast from a local restaurant (1004). An AV navigates to the restaurant to pick up pre-ordered breakfast prior to scheduled passenger pickup (1006). After the pickup of the breakfast, the AV navigates to ride starting location to pick up the passenger (1008). The passenger consumes breakfast during transportation to the ride destination location (1010). The AV drops off the passenger at the ride destination location (1012).

Figure 10B:
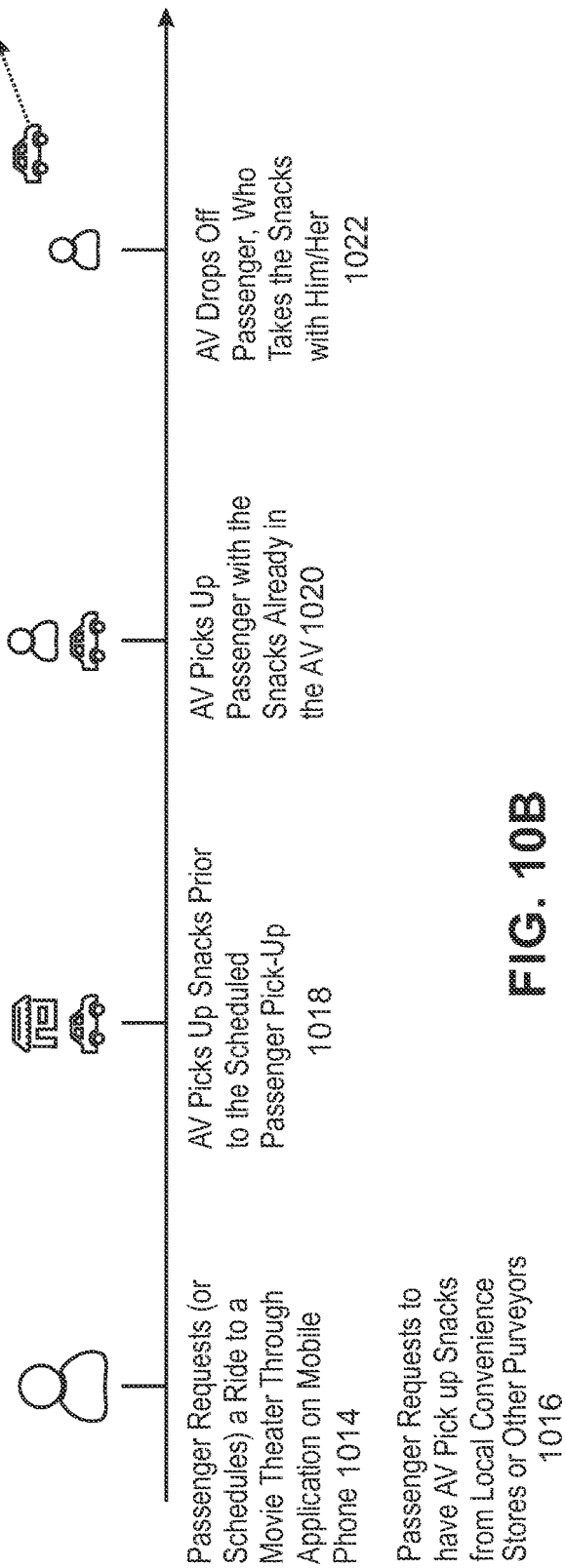
FIG. 10B illustrates another example sequence diagram of picking up food prior to the start of a passenger ride.

FIG. 10B illustrates another example sequence diagram of executing another errand prior to the start of a passenger ride. The sequence diagram of FIG. 10B is implemented (e.g., completely, partially, and/or the like) by the architecture 600 of FIG. 6, the architecture 700 of FIG. 7, the architecture 800 of FIG. 8, or any combinations thereof. In an example, a passenger or a user requests a ride (e.g., initiates a ride request) to a movie theater through an application executing, at least partially, on a user device, e.g., a mobile phone (1014). The passenger also initiates an errand request, e.g., the passenger requests to have an AV pick up snacks (e.g., candies, popcorns) from a local convenience store or other purveyor (1016). An AV navigates to the local convenience store to pick up pre-ordered snacks prior to scheduled passenger pickup (1018). After the pickup of the snacks, the AV navigates to the ride starting location to pick up the passenger (1020). The AV navigates to the ride destination location and drops off the passenger at the ride destination location. The passenger takes the snacks with him/her and leaves the AV (1022).

Figure 11:
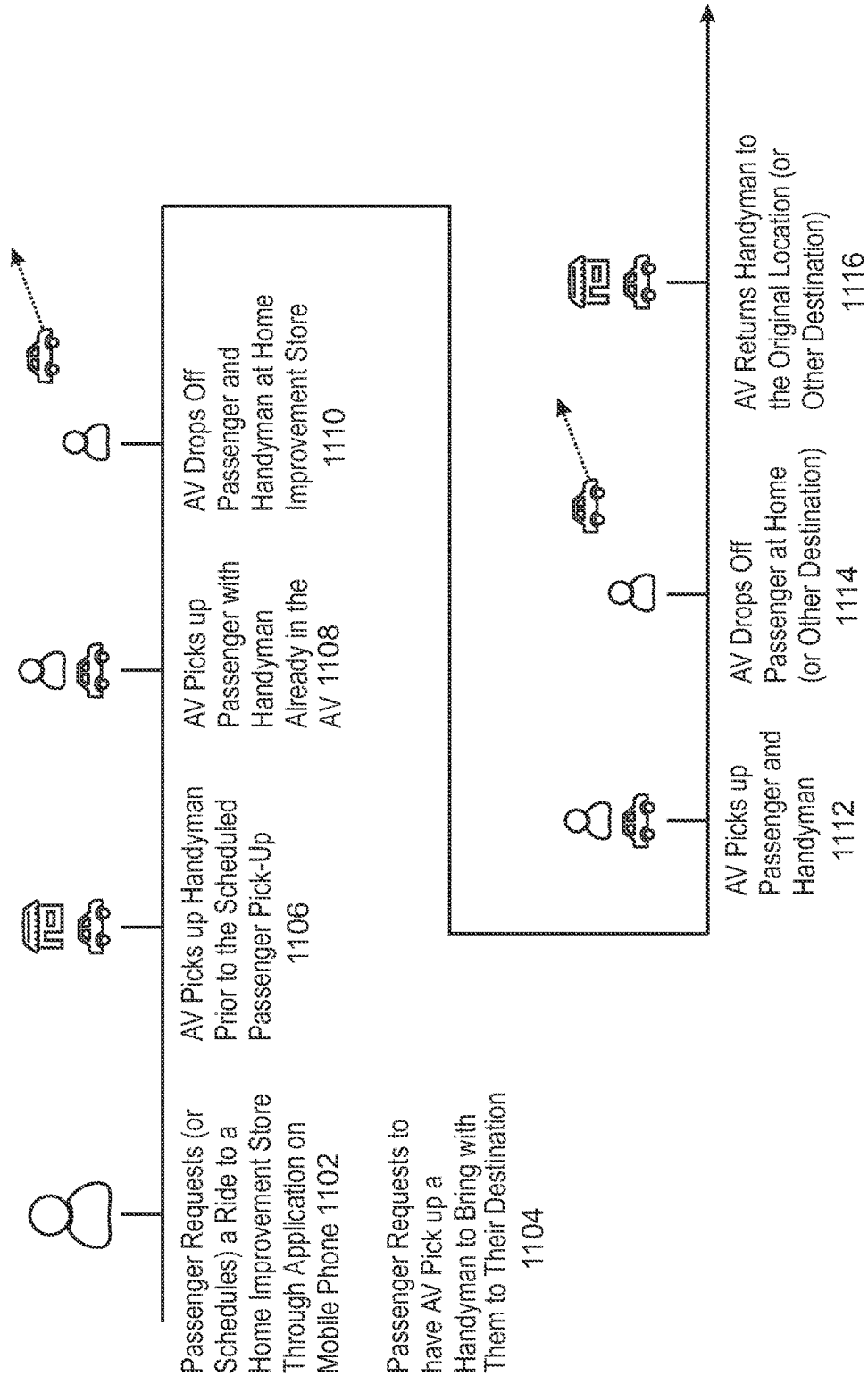
FIG. 11 illustrates an example sequence diagram of providing a service between two rides.

FIG. 11 illustrates an example sequence diagram of executing another errand between two rides. The sequence diagram of FIG. 11 is implemented (e.g., completely, partially, and/or the like) by the architecture 600 of FIG. 6, the architecture 700 of FIG. 7, the architecture 800 of FIG. 8, or any combinations thereof. In an example, a passenger or a user requests a ride (e.g., initiates a ride request) to a home improvement store through an application executing, at least partially, on a user device, e.g., a mobile phone (1102). The passenger also initiates an errand request, e.g., the passenger requests to have an AV pick up a handyman to provide a service (1104). An AV navigates to a first location to pick up a handyman prior to scheduled passenger pickup (1106). After the pickup of the handyman, the AV navigates to a second location to pick up the passenger (1108). The passenger drops off the passenger and the handyman at the home improvement store (1110). The handyman provides service at the home improvement store for a predetermined period of time, e.g., two hours. Two hours later, the AV picks up the passenger and the handyman from the home improvement store (1112). The AV drops off the passenger at a third location (1114). Then AV navigates to a fourth location to drop off the handyman (1116).

In some embodiments, the passenger requests to have an AV pick up other professionals, such as a hairdresser, a nail stylist, a massage therapist, a contractor, a plumber, an electrician, etc. In some embodiments, the professional provides service during a ride. For example, a nail stylist or a massage therapist starts to provide service after the pickup of the passenger and before the drop-off of the professional and the passenger.

Figure 12:
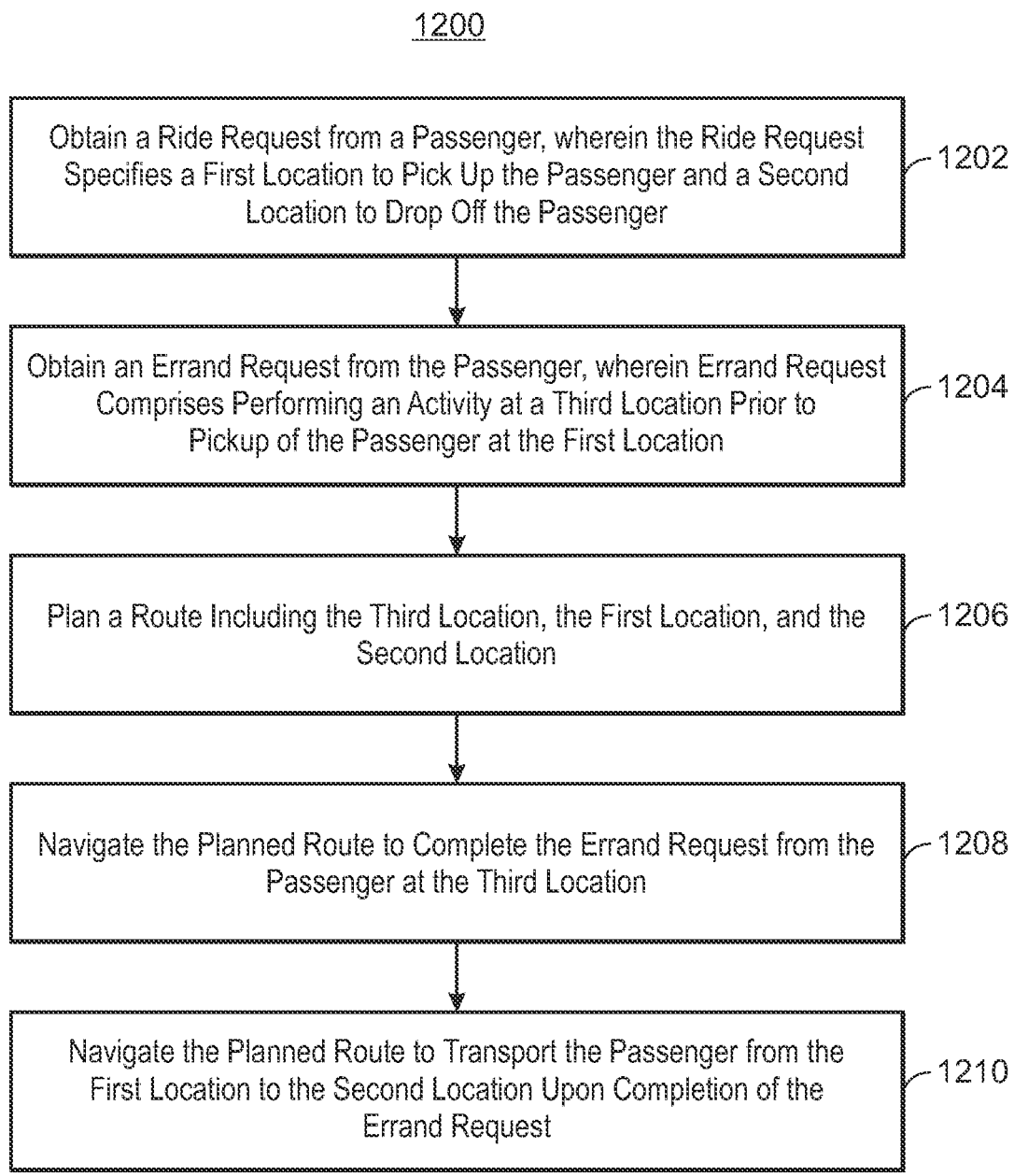
FIG. 12 illustrates an example flow chart of completing an errand request prior to fulfilling a ride request.

FIG. 12 illustrates an example flow chart of a process 1200 that enables completing an errand request prior to fulfilling a ride request. In some embodiments, process 1200 is implemented (e.g., completely, partially, etc.) using an autonomous system that is the same as or similar to autonomous system 202, described in reference to FIG. 2. In some embodiments, one or more of the steps of process 1200 are performed (e.g., completely, partially, and/or the like) by another device or system, or another group of devices and/or systems that are separate from, or include, the autonomous system. For example, one or more steps of process 1200 can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4). In some embodiments, the steps of process 1200 may be performed between any of the above-noted systems in cooperation with one another.

In some implementations, the example process 1200 shown in FIG. 12 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 12 can be executed as multiple separate operations, or one or more subsets of the operations shown in FIG. 12 can be combined and executed as a single operation.

In some embodiments, at block 1202, an AV receives or obtains a ride request from a passenger. The ride request specifies a first location (ride starting location) to pick up the passenger and a second location (ride destination location) to drop off the passenger.

At block 1204, the AV receives or obtains an errand request from the passenger. The errand request is, e.g., to pick up an item or a person at a third location (the location where the item or a person is located) prior to the pickup of the passenger at the first location.

At block 1206, the AV plans a route including the third location, the first location, and the second location.

At block 1208, the AV navigates the planned route to complete the errand request from the passenger at the third location. Prior to or before fulfilling a ride request, the AV completes the errand request (e.g., picking up an item or a person at the third location).

At block 1210, the AV navigates the planned route to transport the passenger from the first location to the second location upon completion of the errand request. Subsequent to or after completing the errand request, the AV fulfills the ride request, i.e., the AV navigates the passenger from the first location to the second location.

Figure 13:
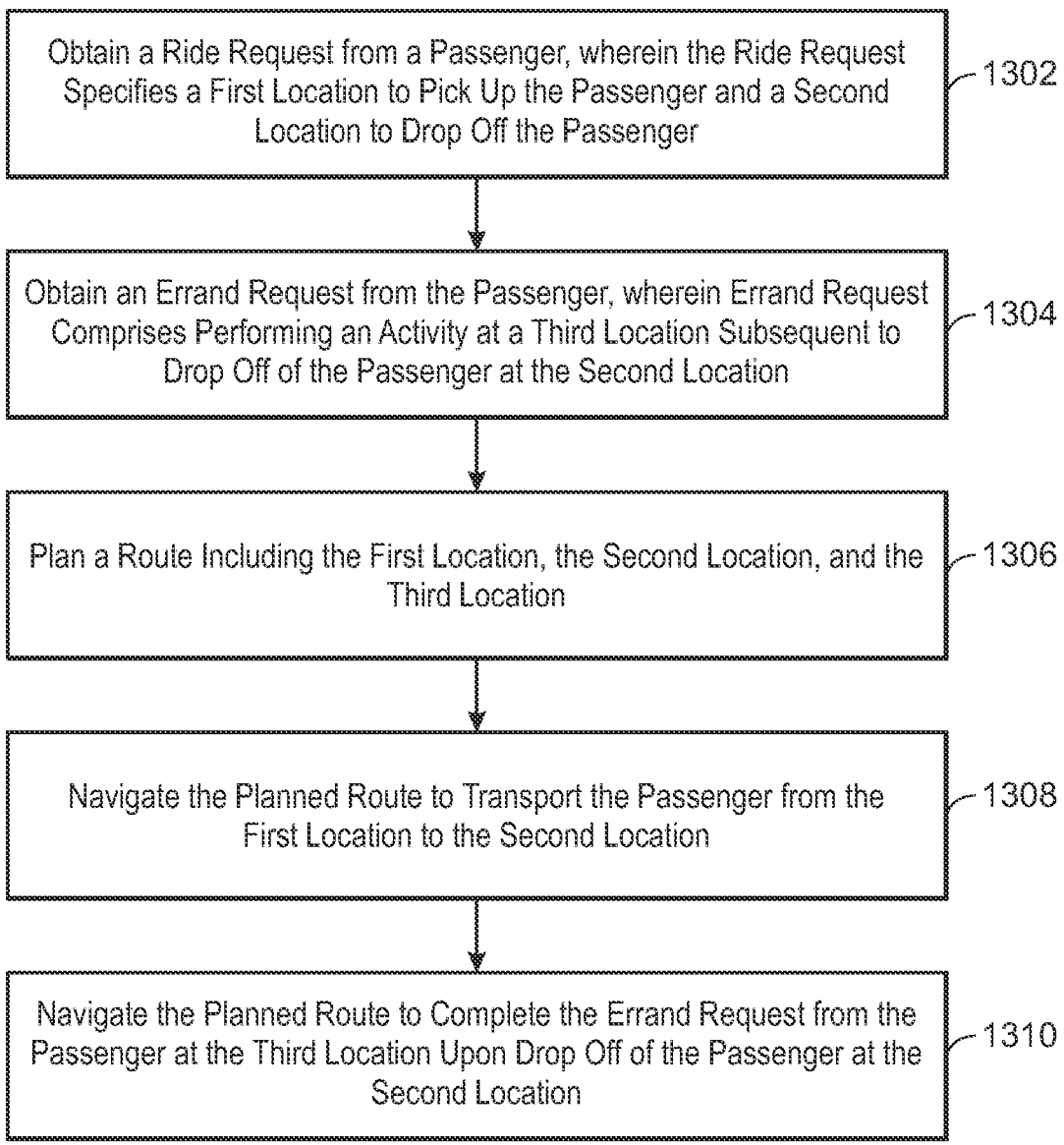
FIG. 13 illustrates an example flow chart of completing an errand request subsequent to fulfilling a ride request.

FIG. 13 illustrates an example flow chart of completing an errand request subsequent to fulfilling a ride request. In some embodiments, process 1300 is implemented (e.g., completely, partially, etc.) using an autonomous system that is the same as or similar to autonomous system 202, described in reference to FIG. 2. In some embodiments, one or more of the steps of process 1300 are performed (e.g., completely, partially, and/or the like) by another device or system, or another group of devices and/or systems that are separate from, or include, the autonomous system. For example, one or more steps of process 1300 can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4). In some embodiments, the steps of process 1300 may be performed between any of the above-noted systems in cooperation with one another.

In some implementations, the example process 1300 shown in FIG. 13 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 13 can be executed as multiple separate operations, or one or more subsets of the operations shown in FIG. 13 can be combined and executed as a single operation.

In some embodiments, at block 1302, an AV receives or obtains a ride request from a passenger. The ride request specifies a first location to pick up the passenger and a second location to drop off the passenger.

At block 1304, the AV receives or obtains an errand request from the passenger. The errand request is to drop off an item or person at a third location subsequent to the drop-off of the passenger at the second location.

At block 1306, the AV plans a route including the first location, the second location, and the third location.

At block 1308, the AV navigates the planned route to transport the passenger from the first location to the second location.

At block 1310, the AV navigates the planned route to complete the errand request from the passenger at the third location upon drop-off of the passenger at the second location. Subsequent to or after the drop-off of the passenger at the second location, the AV completes the errand request, i.e., the AV drops off the item or person at the third location.

According to some non-limiting embodiments or examples, provided is a method, including obtaining, with at least one processor, a ride request from a passenger, wherein the ride request specifies a first location to pick up the passenger and a second location to drop off the passenger; obtaining, with the at least one processor, an errand request from the passenger, wherein the errand request comprises performing an activity at a third location prior to pickup of the passenger at the first location; planning, with the at least one processor, a route comprising the third location, the first location, and the second location; navigating, with the at least one processor, the planned route to complete the errand request from the passenger at the third location; and navigating, with the at least one processor, the planned route to transport the passenger from the first location to the second location upon completion of the errand request.

According to some non-limiting embodiments or examples, provided is a system, including at least one processor; and a memory storing instructions thereon that, when executed by the at least one processor, cause the at least one processor to perform operations, including: obtaining, with the at least one processor, a ride request from a passenger, wherein the ride request specifies a first location to pick up the passenger and a second location to drop off the passenger; obtaining, with the at least one processor, an errand request from the passenger, wherein the errand request comprises performing an activity at a third location subsequent to drop-off of the passenger at the second location; planning, with the at least one processor, a route comprising the first location, the second location, and the third location; navigating, with the at least one processor, the planned route to transport the passenger from the first location to the second location; and navigating, with the at least one processor, the planned route to complete the errand request from the passenger at the third location upon drop-off of the passenger at the second location.

According to some non-limiting embodiments or examples, provided is at least one non-transitory computer-readable medium comprising one or more instructions that, when executed by at least one processor, cause the at least one processor to perform operations, including: obtaining, with at least one processor, a ride request from a passenger, wherein the ride request specifies a first location to pick up the passenger and a second location to drop off the passenger; obtaining, with the at least one processor, an errand request from the passenger, wherein the errand request comprises performing an activity at a third location prior to pickup of the passenger at the first location; planning, with the at least one processor, a route comprising the third location, the first location, and the second location; navigating, with the at least one processor, the planned route to complete the errand request from the passenger at the third location; and navigating, with the at least one processor, the planned route to transport the passenger from the first location to the second location upon completion of the errand request.

Clause 1: A method, including obtaining, with at least one processor, a ride request from a passenger, wherein the ride request specifies a first location to pick up the passenger and a second location to drop off the passenger; obtaining, with the at least one processor, an errand request from the passenger, wherein the errand request comprises performing an activity at a third location prior to pickup of the passenger at the first location; planning, with the at least one processor, a route comprising the third location, the first location, and the second location; navigating, with the at least one processor, the planned route to complete the errand request from the passenger at the third location; and navigating, with the at least one processor, the planned route to transport the passenger from the first location to the second location upon completion of the errand request. In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Clause 2: The method of clause 1, wherein the errand request is to pick up at least one item from the third location.

Clause 3: The method of clause 2, wherein the at least one item includes at least one piece of equipment, a device, foods, or groceries.

Clause 4: The method of any one of clauses 1-3, wherein the errand request is to pick up at least one human service provider from the third location.

Clause 5: The method of clause 4, wherein the at least one human service provider is a hairdresser, a nail stylist, a massage therapist, a handyman, a contractor, a plumber, an electrician, or other professional.

Clause 6: The method of clause 4, wherein the at least one human service provider provides a service during transportation of the passenger from the first location to the second location.

Clause 7: The method of any one of clauses 1-6, wherein the errand request is to pick up at least one pet or at least one person from the third location.

Clause 8: A system comprising: at least one processor; and a memory storing instructions thereon that, when executed by the at least one processor, cause the at least one processor to perform operations, comprising: obtaining, with the at least one processor, a ride request from a passenger, wherein the ride request specifies a first location to pick up the passenger and a second location to drop off the passenger; obtaining, with the at least one processor, an errand request from the passenger, wherein the errand request comprises performing an activity at a third location subsequent to drop-off of the passenger at the second location; planning, with the at least one processor, a route comprising the first location, the second location, and the third location; navigating, with the at least one processor, the planned route to transport the passenger from the first location to the second location; and navigating, with the at least one processor, the planned route to complete the errand request from the passenger at the third location upon drop-off of the passenger at the second location.

Clause 9: The system of clause 8, wherein the errand request is to drop off at least one item at the third location.

Clause 10: The system of clause 9, wherein the at least one item includes at least one piece of equipment, a device, foods, or groceries.

Clause 11: The system of any one of clauses 8-10, wherein the errand request is to drop off at least one human service provider at the third location.

Clause 12: The system of clause 11, wherein the at least one human service provider is a hairdresser, nail stylist, massage therapist, handyman, contractor, plumber, electrician, or other professional.

Clause 13: The system of any one of clauses 8-12, wherein the errand request is to drop off at least one pet or at least one person at the third location.

Clause 14: A non-transitory, computer-readable storage medium having instructions stored thereon, that when executed by at least one processor, cause the at least one processor to perform operations, comprising: obtaining, with at least one processor, a ride request from a passenger, wherein the ride request specifies a first location to pick up the passenger and a second location to drop off the passenger; obtaining, with the at least one processor, an errand request from the passenger, wherein the errand request comprises performing an activity at a third location prior to pickup of the passenger at the first location; planning, with the at least one processor, a route comprising the third location, the first location, and the second location; navigating, with the at least one processor, the planned route to complete the errand request from the passenger at the third location; and navigating, with the at least one processor, the planned route to transport the passenger from the first location to the second location upon completion of the errand request.

Clause 15: The computer-readable storage medium of clause 14, wherein the errand request is to pick up at least one item from the third location.

Clause 16: The computer-readable storage medium of clause 15, wherein the at least one item includes at least one piece of equipment, a device, foods, or groceries.

Clause 17: The computer-readable storage medium of any one of clauses 14-16, wherein the errand request is to pick up at least one human service provider from the third location.

Clause 18: The computer-readable storage medium of clause 17, wherein the at least one human service provider is a hairdresser, a nail stylist, a massage therapist, a handyman, a contractor, a plumber, an electrician, or other professional.

Clause 19: The computer-readable storage medium of clause 17, wherein the at least one human service provider provides a service during transportation of the passenger from the first location to the second location.

Clause 20: The computer-readable storage medium of any one of clauses 14-19, wherein the errand request is to pick up at least one pet or at least one person from the third location.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, the term "further comprising" is used in the foregoing description or following claims, what follows this phrase can be an additional step or entity, or a sub-step/sub-entity of a previously-recited step or entity.

What is claimed is:

1. A method, comprising:
   obtaining, with at least one processor, a ride request from a passenger, wherein the ride request specifies a first location to pick up the passenger and a second location to drop off the passenger;
   obtaining, with the at least one processor, an errand request from the passenger, wherein the errand request comprises performing an activity at a third location prior to pickup of the passenger at the first location, wherein the errand request comprises picking up at least one human service provider from the third location;
   planning, with the at least one processor, a route comprising the third location, the first location, and the second location;
   navigating, with the at least one processor, the planned route to complete the errand request from the passenger at the third location; and
   navigating, with the at least one processor, the planned route to transport the passenger from the first location to the second location upon completion of the errand request, wherein the at least one human service provider is configured to provide a service during transportation of the passenger from the first location to the second location.

2. The method of claim 1, wherein the errand request further comprises picking up at least one item from the third location.

3. The method of claim 2, wherein the at least one item includes at least one piece of equipment, a device, foods, or groceries.

4. The method of claim 1, wherein the at least one human service provider is a hairdresser, a nail stylist, a massage therapist, a handyman, a contractor, a plumber, an electrician, or other professional.

5. A system comprising:
  at least one processor; and
  a memory storing instructions thereon that, when executed by the at least one processor, cause the at least one processor to perform operations, comprising:
  obtaining, with the at least one processor, a ride request from a passenger, wherein the ride request specifies a first location to pick up the passenger and a second location to drop off the passenger;
  obtaining, with the at least one processor, an errand request from the passenger, wherein the errand request comprises performing an activity at a third location subsequent to drop-off of the passenger at the second location, wherein the errand request comprises dropping off at least one human service provider from the third location;
  planning, with the at least one processor, a route comprising the first location, the second location, and the third location;
  navigating, with the at least one processor, the planned route to transport the passenger from the first location to the second location, wherein the at least one human service provider is configured to provide a service during transportation of the passenger from the first location to the second location; and
  navigating, with the at least one processor, the planned route to complete the errand request from the passenger at the third location upon drop-off of the passenger at the second location.

6. The system of claim 5, wherein the errand request further comprises dropping off at least one item at the third location.

7. The system of claim 6, wherein the at least one item includes at least one piece of equipment, a device, foods, or groceries.

8. The system of claim 5, wherein the at least one human service provider is a hairdresser, nail stylist, massage therapist, handyman, contractor, plumber, electrician, or other professional.

9. A non-transitory, computer-readable storage medium having instructions stored thereon, that when executed by at least one processor, cause the at least one processor to perform operations, comprising:
  obtaining, with at least one processor, a ride request from a passenger, wherein the ride request specifies a first location to pick up the passenger and a second location to drop off the passenger; obtaining, with the at least one processor, an errand request from the passenger, wherein the errand request comprises performing an activity at a third location prior to pickup of the passenger at the first location, wherein the errand request comprises picking up at least one human service provider from the third location;
  planning, with the at least one processor, a route comprising the third location, the first location, and the second location;
  navigating, with the at least one processor, the planned route to complete the errand request from the passenger at the third location; and
  navigating, with the at least one processor, the planned route to transport the passenger from the first location to the second location upon completion of the errand request, wherein the at least one human service provider is configured to provide a service during transportation of the passenger from the first location to the second location.

10. The computer-readable storage medium of The computer-readable storage medium of wherein the errand request further comprises picking up at least one item from the third location.

11. The computer-readable storage medium of claim 10, wherein the at least one item includes at least one piece of equipment, a device, foods, or groceries.

12. The computer-readable storage medium of claim 9, wherein the at least one human service provider is a hairdresser, a nail stylist, a massage therapist, a handyman, a contractor, a plumber, an electrician, or other professional.

* * * * *

UNITED STATES PATENT AND TRADEMARK OFFICE
CERTIFICATE OF CORRECTION

| | |
|---|---|
| PATENT NO. | : 12,228,412 B2 |
| APPLICATION NO. | : 17/878770 |
| DATED | : February 18, 2025 |
| INVENTOR(S) | : Kevin C. Gall, Bence Cserna and Alexander Brown |

Page 1 of 1

It is certified that error appears in the above-identified patent and that said Letters Patent is hereby corrected as shown below:

In the Claims

Column 26, Line 29-30 (Approx.), In Claim 10, delete "The computer-readable storage medium of The computer-readable storage medium of" and insert -- The computer-readable storage medium of claim 9, --.

Signed and Sealed this
First Day of April, 2025

Coke Morgan Stewart
*Acting Director of the United States Patent and Trademark Office*